Patented Oct. 22, 1929

1,732,419

UNITED STATES PATENT OFFICE

GEORGE ELTON RICE, OF BROOKLYN, NEW YORK, ASSIGNOR, BY DIRECT AND MESNE ASSIGNMENTS, TO CONSERVATION CORPORATION OF AMERICA, A CORPORATION OF DELAWARE

PROCESS FOR TREATING, IMPREGNATING, AND STABILIZING WOOD

No Drawing. Application filed July 18, 1924. Serial No. 726,834.

The present invention relates to the treatment of wood and wood products, and the fundamental object of the invention is to provide a novel process for treating wood in a simple, practical and efficient manner, in order to remove, without injury to the fibres, cell walls, etc., the extraneous matters, such as excess air, sap, starches, sugars, resins, gums, acids, alkali and albuminous matter, and to replace such matters with a solution that preserves and compacts the fibres, reduces the cell spaces and stabilizes the wood, thereby reducing the liability of warping, shrinkage and rot.

Another object is to provide a method for treating wood, which is highly efficient for valuable woods, and for improving low grade or weak fibre woods, so as to enhance the figure, and to compact the fibre, and, when desired, to strengthen and compact the sap or summer wood and to equalize the wood so that it will be uniform in absorption of the finishing materials. For example, red gum is colored and compacted, by the present process, to resemble the shades of black walnut; tupelo is stabilized and the figure enhanced; beech is strengthened; and birch is treated so that the figure remains clear and more uniform when finished; and the same and more are accomplished without the aid of manufactured colors, and only such natural materials, as used for the wood treatment, are employed.

A further object is to treat the wood so that there will be no breaking down of the cell walls, to obtain the full strength of the cell walls and fibres, and so that the cell walls are swollen to reduce the air or absorption spaces, said cell walls being filled or impregnated and the fibres filled or compacted; and, furthermore, the soft or spongy portions are filled and after the oxidation of the preserving materials has been completed, with natural or artificial drying, the absorption properties of the wood are equalized.

The present process contemplates the treatment of the wood in its natural state, without previous drying, for the purpose of more readily removing the extraneous matters therefrom, such as natural moisture, sap, starches, sugars, gum, acids, oils, resin, tannins, albumin, etc., before they become coagulated, thus preventing the liability of fracturing the cell walls or fibres, and reducing season checking and degrading.

A still further object is the provision of a process of the kind indicated utilizing a specified syrup or saccharine solution for accomplishing the results above indicated, and a still further object, in this connection, is the use, in combination with the syrup or saccharine solution, such other ingredient or ingredients as to accelerate or hasten the drying of the treated lumber, to prevent fermentation of the preservatives or solution used, as well as facilitating the treatment of the wood itself and obtaining other advantages.

Another object is to embody in the process, if so desired, the saturation of the treated wood within an oil, to assist in removing excess matters and stabilizing the wood, as well as rendering same a non-conductor of electrical energy and moisture proof.

In carrying out the process, the wood may be of any shape or form, either logs, squared timber, or wood products cut to size and shape as may be desired, and if logs are treated, the bark and small branches are first removed. The wood is immersed in a solution, which may vary according to the density or absorption properties of the wood, and according to the use to which the wood is to be put. For example, for the treatment of hickory, maple or birch, a typical solution comprises 1200 pounds of water and 360 pounds of semi-invert sugar (either cane, beet or corn sugar) which contains not less than 40% of sucrose and not less than 20% of dextrose, or corn syrup which contains not less than 35% of natural dextrose and dextrin, the balance of the sugar being natural materials. To such solution there is added not less than 20% of dextrose manufactured from corn, either as glucose or in granulated form (no prepared dextrine by hydrolizing, or roasted starch, being used), and there is also added 15 pounds of sodium fluoride, and when the wood contains alkali and acid, there is added to the solution ½ of 1% (of total weight of solution) of sodium carbonate (commercial soda ash 58%).

These proportions may vary according to different grades of woods to be treated, but the amount of syrup or saccharine material is substantially 25% of the water, by weight.

When it is desired that the wood be thoroughly insect or fungi proof, as well as being protected against rot, mold, stains, etc., sodium fluoride is added to the solution, in addition to the amount hereinbefore stated, amounting to substantially 3½ percent of the total weight of the solution, or, for the proportions given, 42 pounds of sodium fluoride in addition to the 15 pounds hereinbefore specified. The 15 pounds of sodium fluoride first mentioned is added to the solution in all cases, excepting when the wood is to be used for food containers or for such purpose as to be liable to come into contact with food products, in order to render the wood insect or fungi proof, and to avoid dry rot, mold, stain, etc. The additional sodium fluoride is used when it is desired to completely protect the wood from the attack of wood destroyers. The partial amount of sodium fluoride will serve as a semi-poisoning of the wood to repel fungus and molds, as well as preventing the solution from fermenting while not being used, such as when stored away for future use.

The specific gravity of such solution at a temperature of about 60 degrees F. is about 1090, which will permit of the solution being thinned by adding water, to the desired reduced specific gravity, based on the density or absorption properties of the wood to be treated. The average specific gravity of the solution, during the treatment, should be between 1060 and 1100, and only water is added to reduce the specific gravity.

The liquor or solution in which the wood is immersed is heated gradually, in order to heat the wood to the center and without damaging the cell walls. Any suitable tank can be used, preferably an open top rectangular tank, which should, for general use, not exceed 7 feet in width to insure proper and rapid regulation of the solution, but the tank may be of any desired length and depth. The solution may be heated directly or indirectly, a preferred manner of heating being by the use of steam coils or radiators submerged in the solution, so that the temperature may be raised gradually to and maintained at the boiling point of water.

The wood may be immersed by several convenient ways, such as by loading the wood on skids or cars run into the tank, by moving the wood into the tank by an overhead conveyor, or by piling the lumber up in the tank. It is desirable to reduce the handling of the wood to a minimum by loading the wood on skids or trucks, or in crates, baskets or other carriers, depending on the size and shape of the wood or wood products. It will, in many instances, also be more economical to shape or prepare the wood previous to treatment, thus saving operating costs, inasmuch as it is unnecessary to treat the wood which is cut away as waste.

When the wood is immersed in the solution, the solution is heated gradually to raise the temperature to the boiling point of water, thereby avoiding injury to the wood. The boiling point at sea level will be 212 degrees F., and will decrease at higher altitudes. The boiling of the wood is continued until all extraneous matters are removed therefrom, which is determined when no further scum rises to the surface of the liquor. During the boiling of the wood, the scum and froth rise to the surface of the solution, and are skimmed off. The skimmings are preserved, and valuable by-products, such as acids, oils, etc., are recovered, and the residuum dehydrated for use as fertilizer or for other purposes.

When the wood has been boiled a sufficient length of time, ranging anywhere from a fraction of an hour to several hours, and no further scum rises to the surface of the liquor, then the wood is removed either immediately or allowed to remain until impregnated to a required density, according to the use or requirements. In other words, the wood is allowed to remain in the solution for a period of time based on the rapidity of the absorption properties of the wood being treated. The wood is then dried in any desired or preferred manner either naturally or by steam heated or other suitable drier. The treated wood has the advantage of drying rapidly, which is facilitated by the presence of the sodium flouride.

As soon as the wood has been removed from the solution, the solution is ready for the next load of wood.

The saccharine base of the solution used for railway ties, bridge timbers, etc., may be a residuum or last run corn syrup, cane molasses, beet molasses, or the like, to which the other ingredients (including 20% of manufactured corn dextrose) are added as hereinbefore described.

The base of the solutions that may be used for lumber to be employed for furniture, interior trim or other interior uses, or for high grade requirements, where the natural color is a requirement or asset, or where the figure is to be enhanced, is a corn syrup of not less then 42% sugar content, or cerrelose sugar of not less than 70% content, mostly dextrose with natural dextrin, or an invert sugar, mostly dextrose. In all cases for high grade treatment at least one third of the total sugars or syrups is to be composed of dextrose, as the osmotic action of dextrose aids in rapidly expelling the extraneous matters and more completely penetrating the lumber. The treated wood will take fillers, varnishes, paints and other finishing materials to best advantage.

During the treatment or boiling of the immersed lumber in the prepared solution, the solution penetrates the wood longitudinally at first, by way of the resin canals or vessels, and such woods as oak, ash, beech, mahogany, etc., respond very rapidly, while in such woods as spruce, the pines, etc., in which there are few or no vessels or resin passages, penetration takes place through the walls of the tracheids, and in some cases a slow transverse penetration by way of the rays. In any case, the preservative solution reaches the center of the summer or sap wood, or immature growth, speedily and completely and where required the heart, when rot has started, is sterilized and the poison prevents further action of the rot fungus.

The process is a natural one, the action of a similar on a similar, and as the wood is impregnated by capillary and osmotic action, the excess matters removed from the wood are replaced by a material of a composition akin to that of the wood itself or its own, the addition of chemicals other than carbohydrates being an added protection against the attack of fungus, chewing and boring insects, and other destructive organisms or fungi.

During the process, as the boiling continues, the deleterious or undesirable elements are thus extracted from the wood by the boiling solution, and as the hot solution reaches the interior of the wood, any remaining albuminoids will be coagulated, fungoid germs or insect pupæ will be killed and complete sterilization will be effected, and the saps and natural moisture vaporized.

The presence of soda ash (sodium carbonate, commercial 58%) will, by a neturalizing action on the acid in the wood form a sodium salt, the nature of which depends on the particular acid in the wood, and the reaction that takes place, so that carbon dioxide is liberated, which helps or assists in expelling loosely or mechanically combined substances present in the wood and in preventing the precipitation of the tannates very largely.

When it is desired to facilitate the deresination of the wood, sodium sulphate is added to the solution amounting to from 3½% to 5%, by weight, of the solution, the proportion of such material used being in accordance with the amount of resin in the wood. For example, southern pine will require at least 5% of sodium sulphate in the solution, while birch or similar woods will require not exceeding 3½% of such ingredient.

When it is desired to water proof the wood and to insulate same for electrical purposes, the wood, after being removed from the saccharine solution, is placed in a tank containing the oil used for that purpose or into which the oil is placed, so that the wood is immersed in the oil. The temperature of the oil is gradually raised from atmospheric temperature to a temperature ranging from 220 to 240 degrees F., depending on the class or kind of oil used. Tung oil or Chinese wood oil requires a temperature of from 230 to 240 degrees before the expelling of air and hygroscopic moisture is accomplished, while raw linseed oil requires only up to 220 degrees F.

The heating of the wood in oil is continued, from a fraction of an hour to several hours depending on the wood, until bubbles cease to rise to the top of the oil, at which time the temperature is decreased and the oil cooled down to 200 degrees or as low as 140 degrees, based on the amount of impregnation desired and the density of the wood. Conifers require a lower cooling point than open or porous woods like birch, beech and similar hardwoods. This step is especially desirable for impregnating such woods as hickory, maple, birch and other woods, with an organic wood oil, such as tung or Chinese wood oil, perilla (an oil produced in Japan, raw linseed oil, or soya bean, or combinations of any of said oils, or a rubber sap called latex. This step is used for impregnating and filling or partly filling the woods to protect and waterproof same, or to prevent moisture entering the wood, which is especially desirable when the wood is designed to be used for electrical purposes, such as for transformers, cross arms, and other insulating purposes. Wood so treated is also especially suitable for use in automobile spokes and the like.

Having thus described the invention, what is claimed as new is:—

1. The process of treating, impregnating and stabilizing wood, consisting in subjecting the wood to a semi-invert sugar solution.

2. The process for treating, impregnating and stabilizing wood consisting in subjecting the wood to a saccharine solution containing a large proportion of corn dextrose.

3. The process for treating, impregnating and stabilizing wood consisting in subjecting the wood to a saccharine solution containing dextrose manufactured from corn.

4. The process for treating, impregnating and stabilizing wood consisting in subjecting the wood to a semi-invert sugar solution containing natural dextrose and an additional substantial percentage of dextrose manufactured from corn.

5. The process of treating wood which consists in subjecting it to a saccharide solution composed at least in substantial part of one or more monosaccharides.

6. The process of treating, impregnating and stabilizing wood consisting in subjecting the wood to a solution containing a substantial proportion of dextrose.

In testimony whereof I hereunto affix my signature.

GEORGE ELTON RICE.